(12) United States Patent
Juarez-Ortega

(10) Patent No.: US 8,376,684 B2
(45) Date of Patent: Feb. 19, 2013

(54) LOADER AND CARRIER APPARATUS

(76) Inventor: Pedro A. Juarez-Ortega, Yukon, OK (US)

( * ) Notice: Subject to any disclaimer, the term of this patent is extended or adjusted under 35 U.S.C. 154(b) by 0 days.

(21) Appl. No.: 13/085,318

(22) Filed: Apr. 12, 2011

(65) Prior Publication Data

US 2011/0250042 A1 Oct. 13, 2011

Related U.S. Application Data

(60) Provisional application No. 61/323,126, filed on Apr. 12, 2010.

(51) Int. Cl.
*B60P 3/10* (2006.01)
(52) U.S. Cl. ...... 414/478; 414/494; 414/500; 280/414.1
(58) Field of Classification Search .................. 414/477, 414/478, 491, 494, 500, 538, 559; 280/414.1
See application file for complete search history.

(56) References Cited

U.S. PATENT DOCUMENTS

| | | | |
|---|---|---|---|
| 3,411,644 A | 11/1968 | Cook | |
| 3,550,800 A | 12/1970 | Robinson | |
| 3,648,866 A | 3/1972 | Slown | |
| 3,732,998 A * | 5/1973 | Martin | 414/462 |
| 3,734,321 A | 5/1973 | Long et al. | |
| 3,840,133 A * | 10/1974 | Berg | 414/462 |
| 3,843,002 A | 10/1974 | Pihlgren | |
| 3,871,540 A * | 3/1975 | Jenkins | 414/462 |
| 3,877,594 A * | 4/1975 | Coakley | 414/462 |
| 3,972,433 A | 8/1976 | Reed | |
| 4,212,580 A | 7/1980 | Fluck | |
| 4,239,438 A * | 12/1980 | Everson | 414/462 |
| 4,274,788 A | 6/1981 | Sutton | |
| 4,420,165 A * | 12/1983 | Goodin | 280/414.1 |
| 5,069,595 A | 12/1991 | Smith et al. | |
| 5,108,248 A * | 4/1992 | Murrill | 414/462 |
| 5,123,799 A * | 6/1992 | Breazeale | 414/462 |
| 5,447,408 A * | 9/1995 | Smith | 414/538 |
| 5,511,928 A | 4/1996 | Ellis | |
| 5,609,462 A | 3/1997 | Reimer | |
| 5,921,741 A * | 7/1999 | Heimgartner | 414/462 |
| 2003/0086778 A1 * | 5/2003 | Smith | 414/500 |

* cited by examiner

*Primary Examiner* — Saul Rodriguez
*Assistant Examiner* — Jonathan Snelting
(74) *Attorney, Agent, or Firm* — Dunlap Codding, P.C.

(57) ABSTRACT

A loader and carrier apparatus for recreational vehicles such as boats, personal watercraft, snowmobiles, all terrain vehicles. The loader and carrier apparatus includes a rack assembly mountable on a vehicle, such as a pickup truck, as well as a wheeled trailer assembly with an upwardly slanted front end. A winch is connected to the rack assembly and functions to pull the slanted front end of the trailer assembly into engagement with a lower horizontal crossbar of the rack assembly so as to guide the frame in an upward direction and thereafter pulls the frame of the trailer assembly over a middle horizontal crossbar until the trailer assembly is caused to rotate to a substantially horizontal position on the rack assembly.

8 Claims, 10 Drawing Sheets

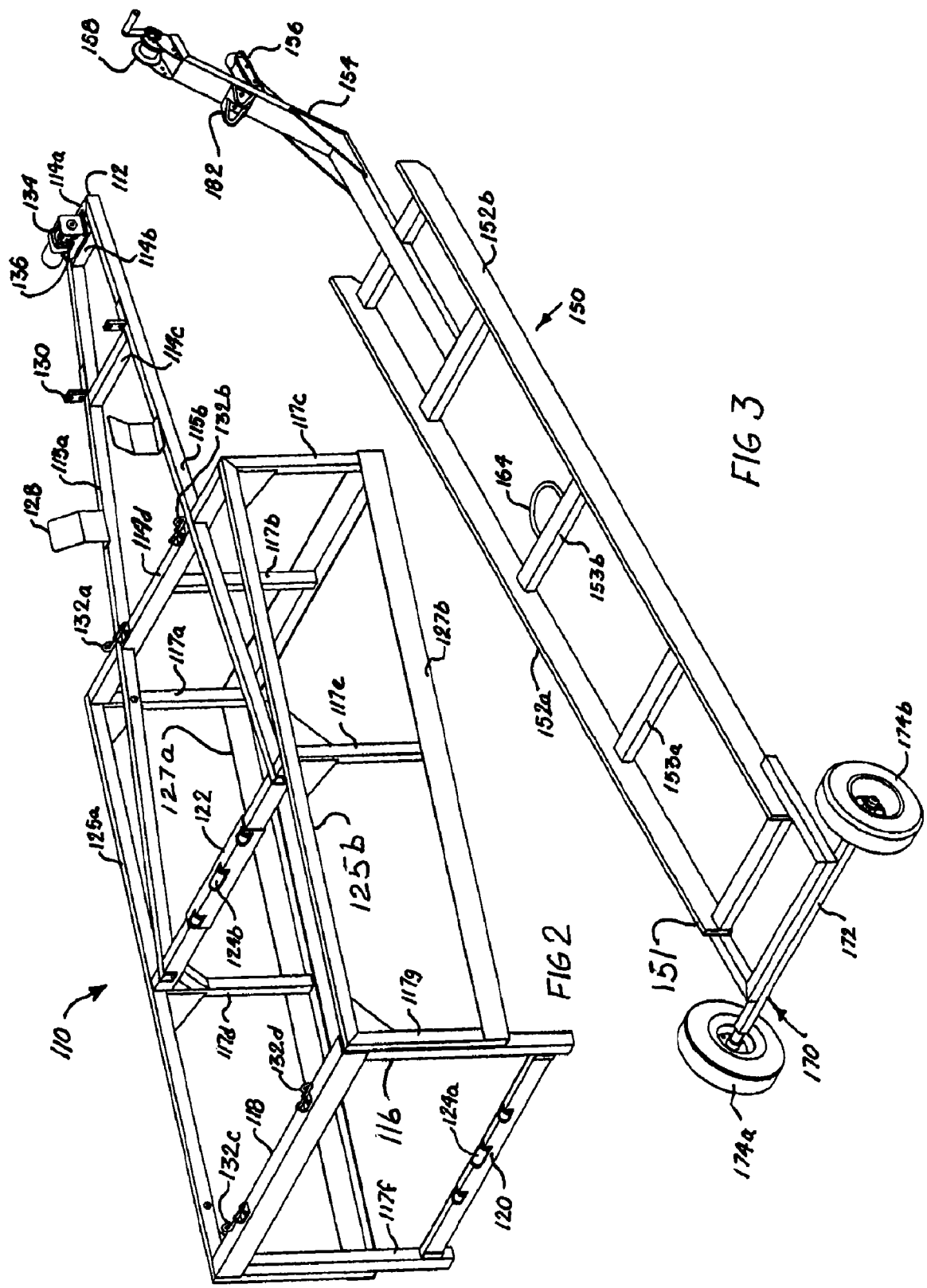

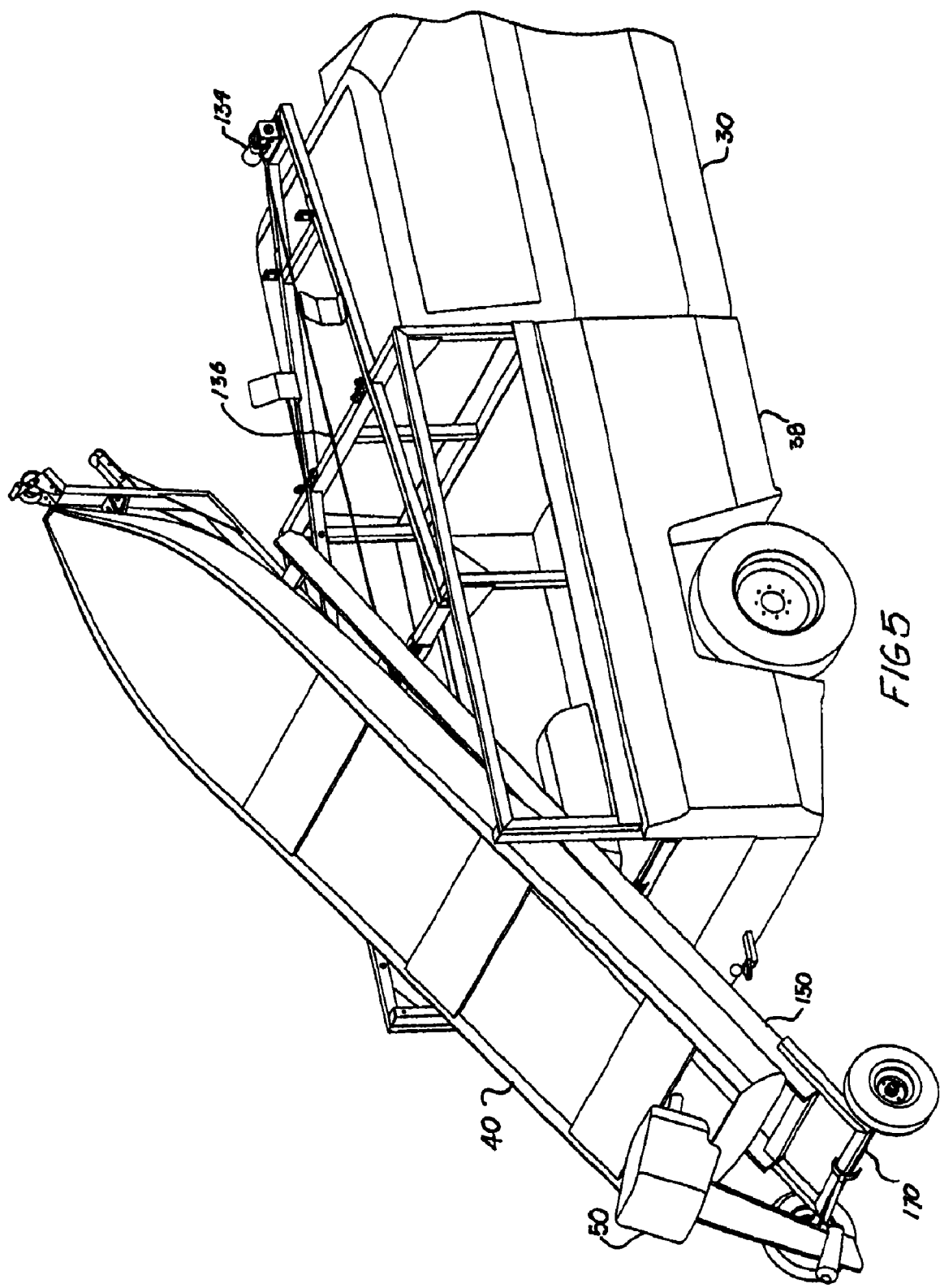

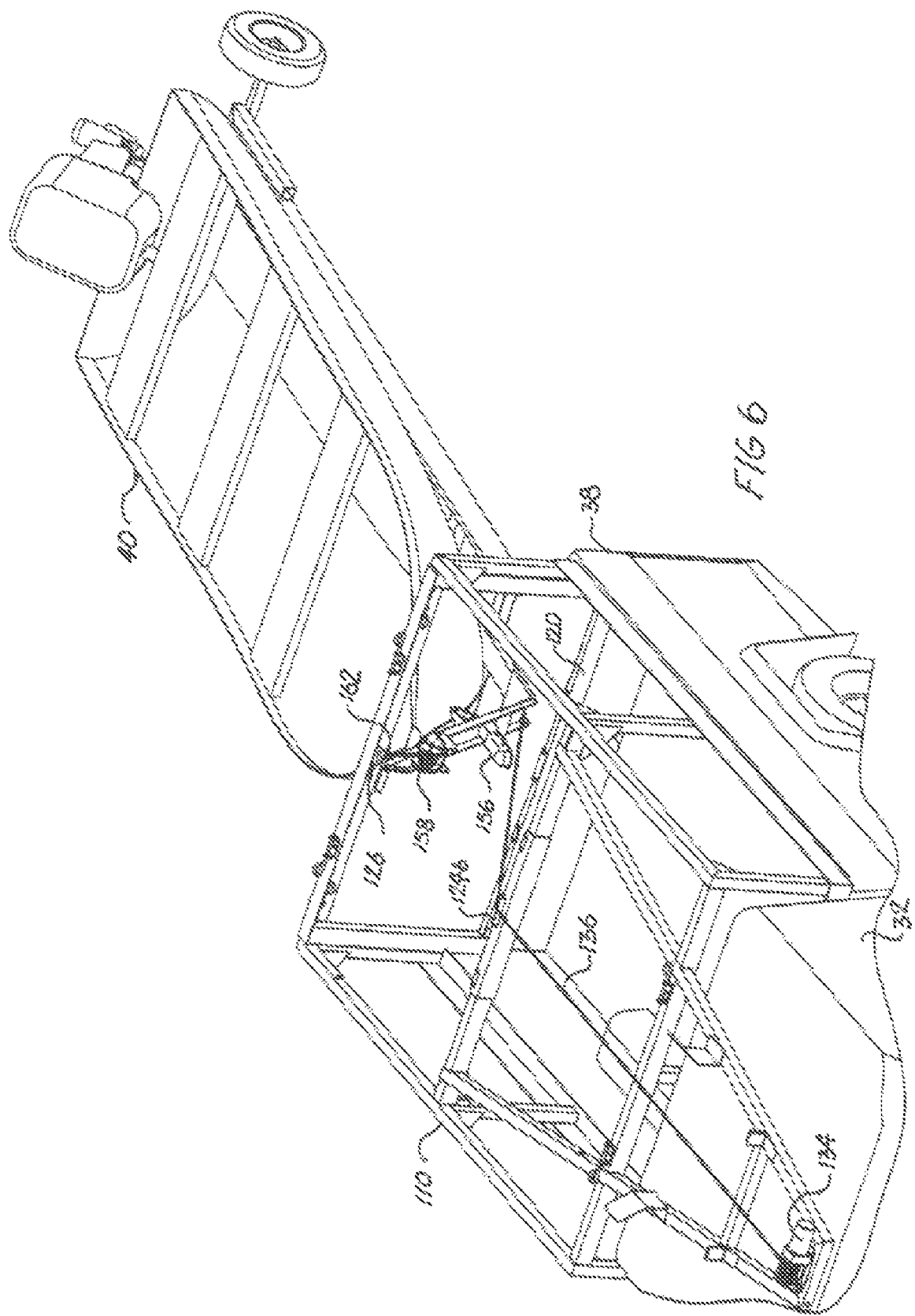

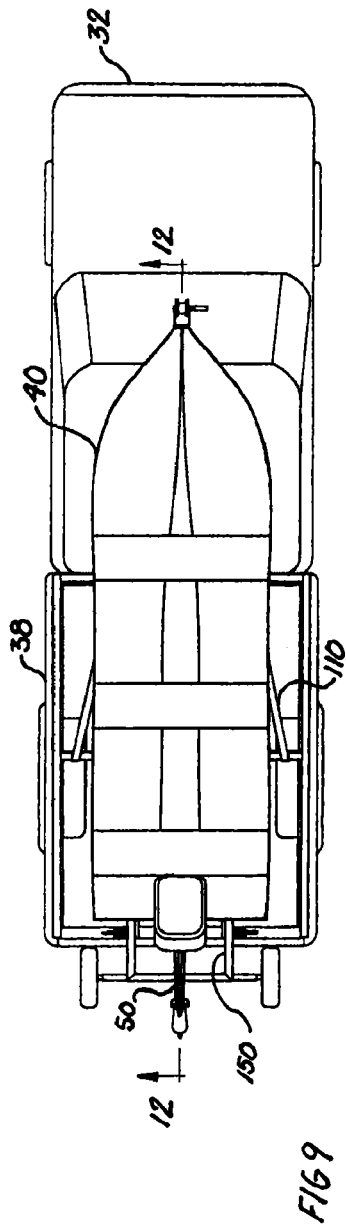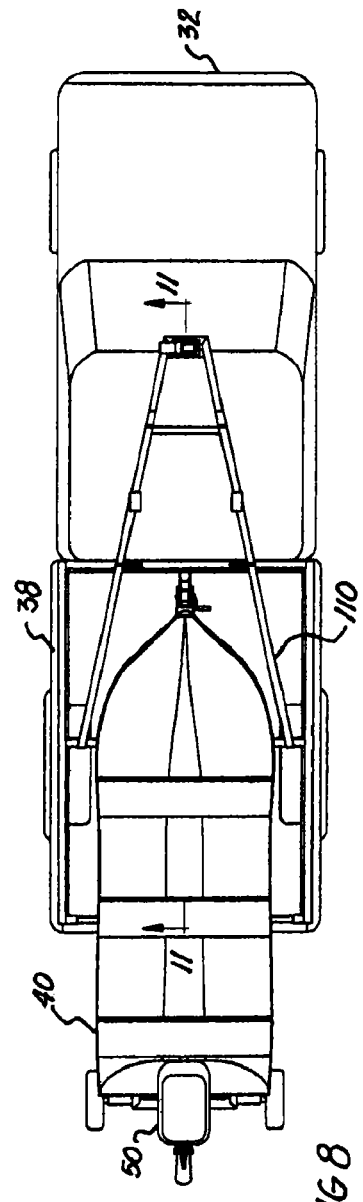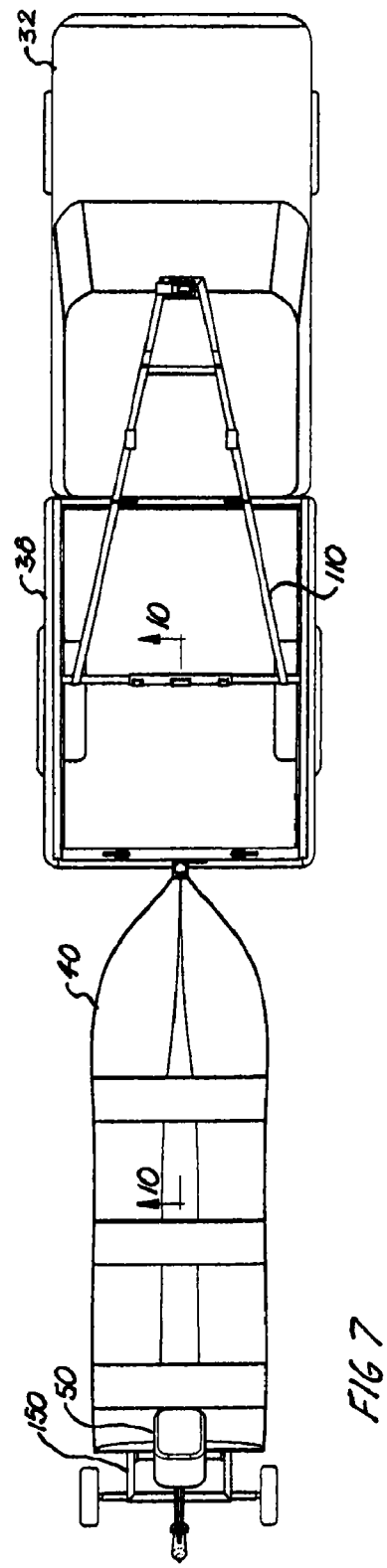

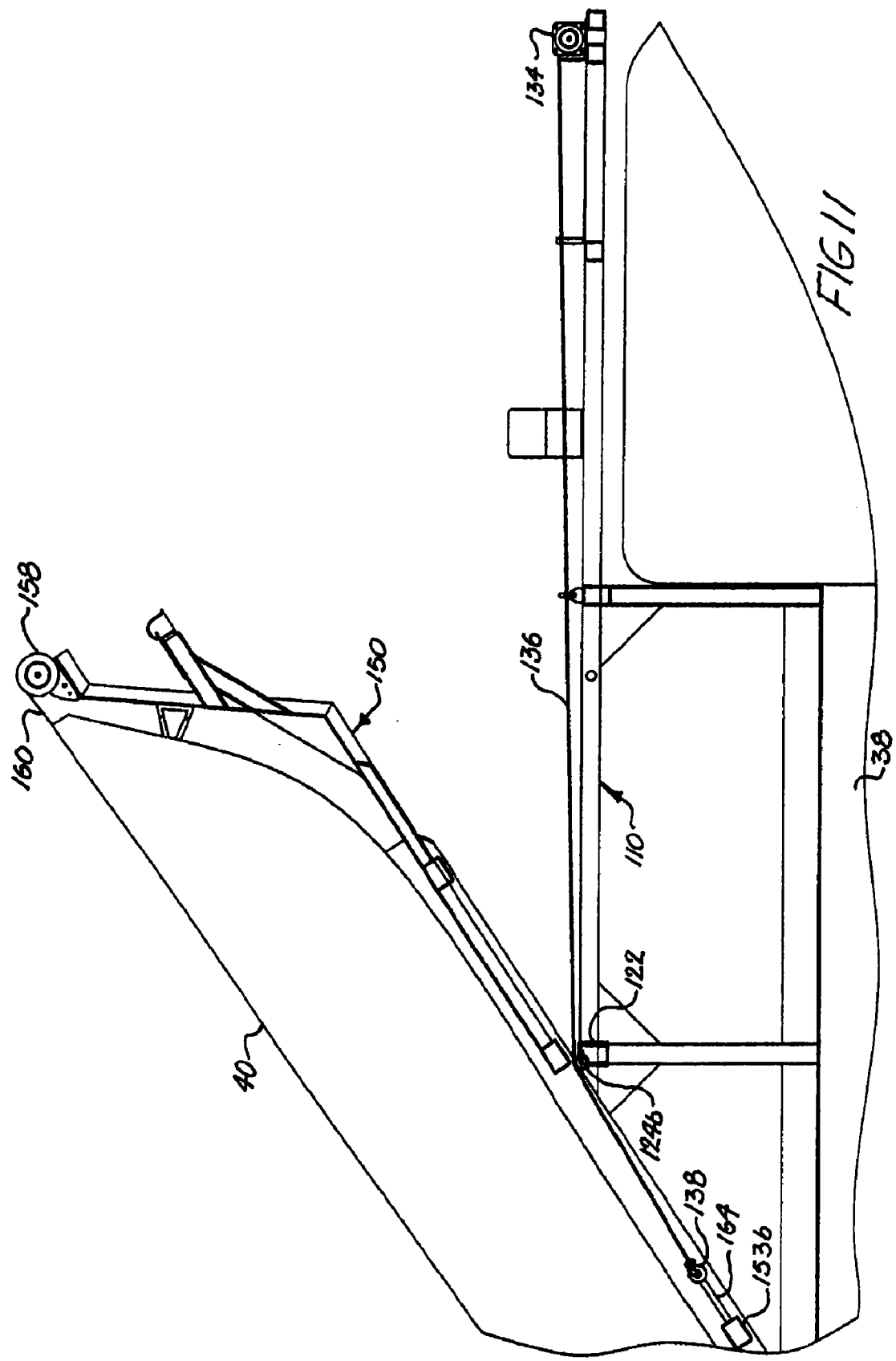

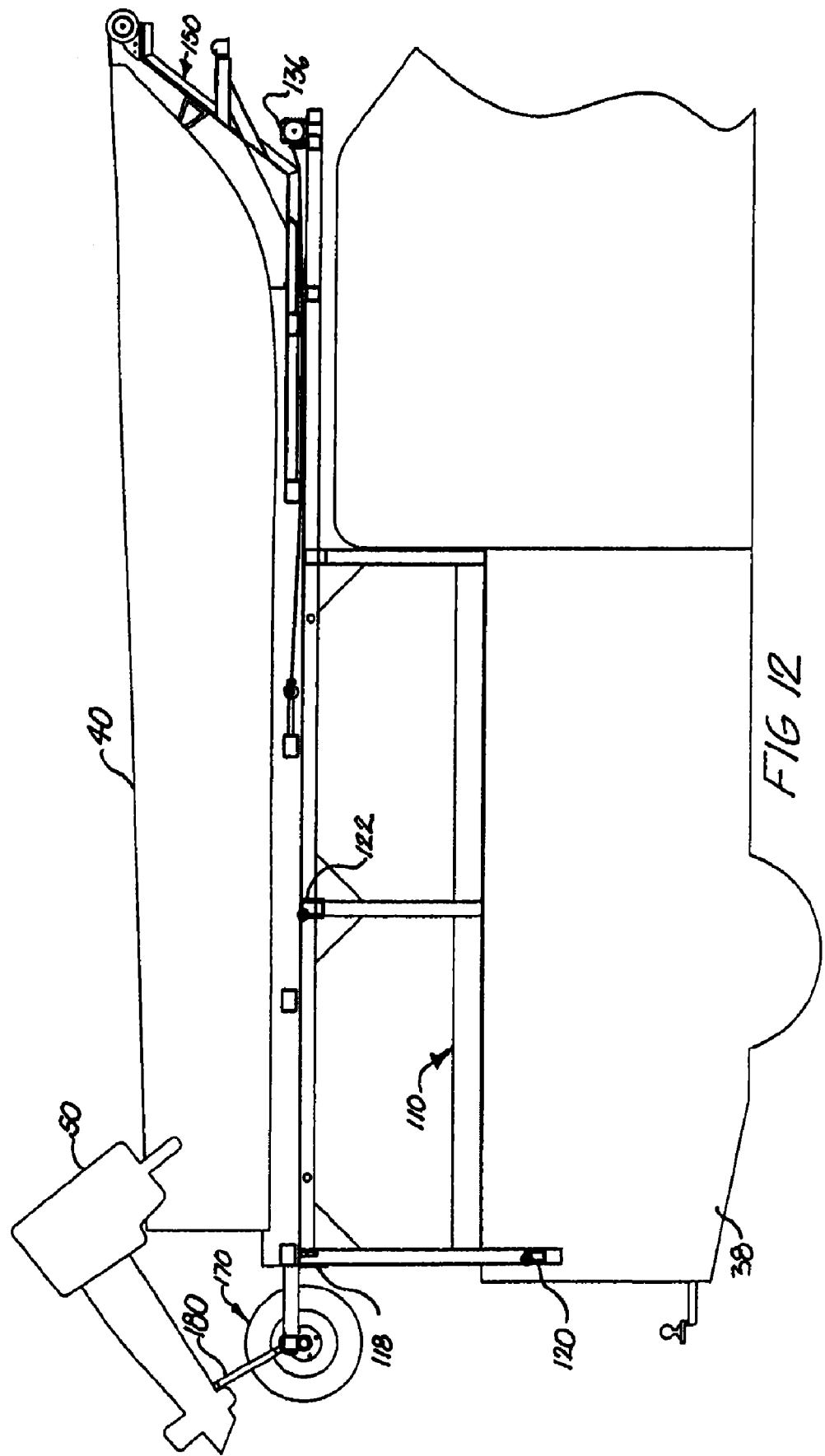

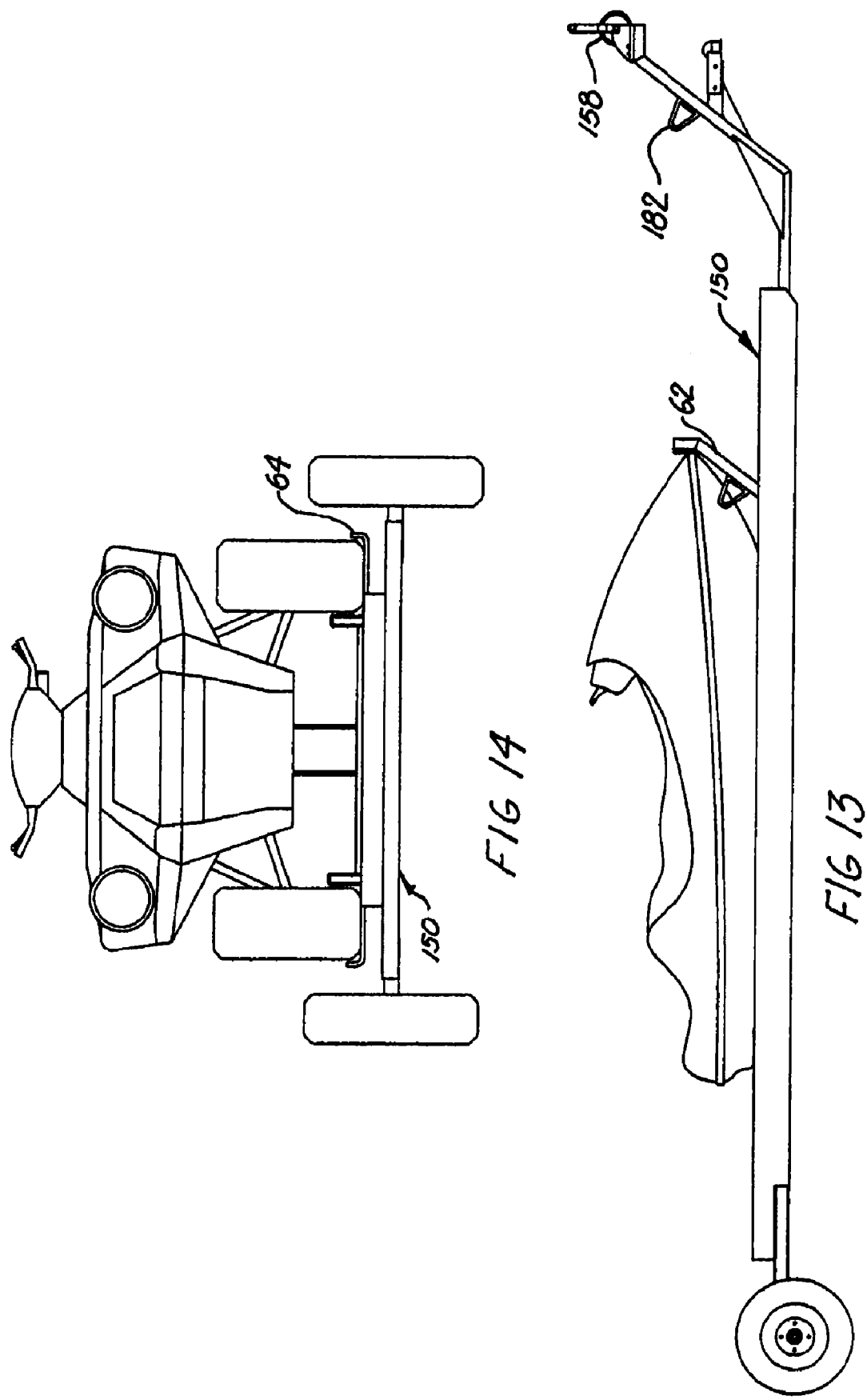

LOADER AND CARRIER APPARATUS

CROSS-REFERENCE TO RELATED APPLICATIONS

The application claims benefit of U.S. Provisional Application No. 61/323,126, filed Apr. 12, 2010, which is hereby expressly incorporated herein by reference in its entirety.

BACKGROUND OF THE INVENTION

1. Field of the Invention

The present invention generally relates to loader and carrier apparatus for loading and carrying vehicles such as boats, jet skies, snow mobiles, all terrain vehicles, and any other similar vehicles, on a carrier vehicle such as a pickup truck or the like.

2. Brief Description of Related Art

Through the years there have been many designs of apparatus that enable carrier vehicles such as pickup trucks to load and carry boats with the boat motor attached so the user can have the back of the truck clear for hauling a trailer, such as a travel trailer. However, placing a relatively large boat over the cargo bed or over the entire truck has presented problems that have led to solutions with similar flaws.

First, loading apparatus for regular boat trailers require the use of ramps or long tracks for the initial approach, adding more parts to the design and increasing the complexity and imposing severe limitations on the functionality of the truck by reducing the space available in the cargo bed with all the hardware needed for the loader. Examples of such devices are Shown U.S. Pat. No. 3,648,866; Long et al. U.S. Pat. No. 3,734,321; Pihlgren U.S. Pat. No. 3,843,002; and Smith et al. U.S. Pat. No. 5,069,595.

Second, other loading apparatus would have several feet of the boat hanging off the back of the truck or needing special hitch extensions to attach a trailer behind. Examples of such devices are W E Robinson U.S. Pat. No. 3,550,800 and R. W. Cook U.S. Pat. No. 3,411,644.

Third, boat loading apparatus with launchers require the truck with the carrier to be the only vehicle capable of taking the boat to the water. Examples of such devices are Reed U.S. Pat. No. 3,972,433, Fluck U.S. Pat. No. 4,212,580; Sutton U.S. Pat. No. 4,274,788; and Ellis U.S. Pat. No. 5,511,928.

Fourth, alternatives without any structure under the boat would add unwanted stress to the hull. An example of such a device is disclosed in Reimer U.S. Pat. No. 5,609,462.

To this end, a need exists for an improved loading and carrying apparatus. It is to such an apparatus that the inventive concepts disclosed herein are directed.

BRIEF DESCRIPTION OF THE SEVERAL VIEWS OF THE DRAWINGS

FIG. 2 is a perspective view of a rack assembly;

FIG. 3 is a perspective view of a trailer assembly;

FIG. 5 is a perspective view of the apparatus showing a step of the loading procedure;

FIG. 6 is a perspective view of the apparatus showing another step of the loading procedure;

FIG. 7 is a top view of the apparatus showing a step of the loading procedure;

FIG. 8 is a top view of the apparatus showing another step of the loading procedure;

FIG. 9 is a top view of the apparatus showing the load carrying position;

FIG. 11 is a cross-sectional view taken along line 11-11 of FIG. 8;

FIG. 12 is a cross-sectional view taken along line 12-12 of FIG. 9;

FIG. 13 is a side elevational view of another embodiment of a trailer assembly; and FIG. 14 is a rear elevational view of another embodiment of a trailer assembly.

DETAILED DESCRIPTION OF THE EXEMPLARY EMBODIMENTS

Figure 1:
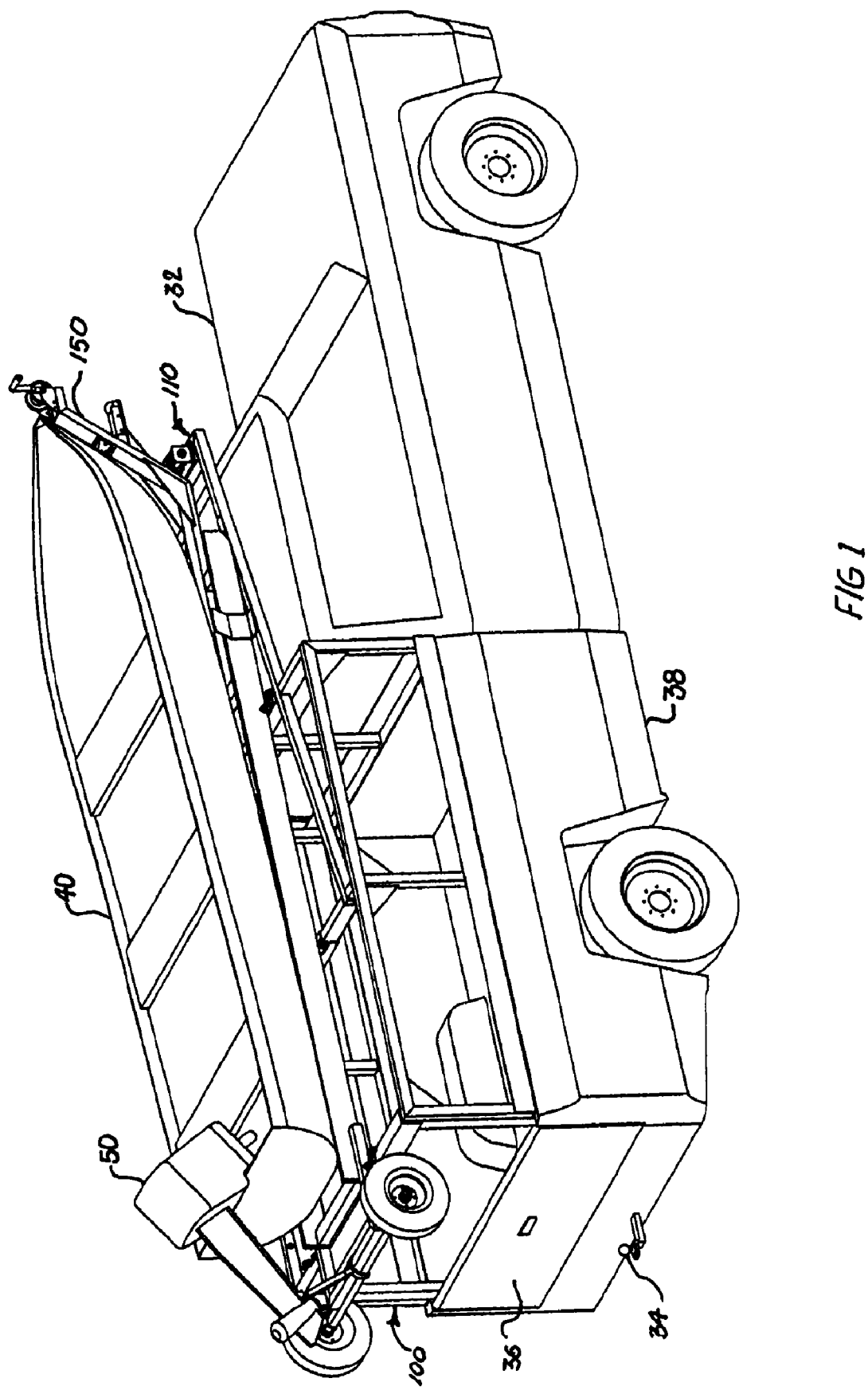
FIG. 1 is a perspective view of an embodiment of a loader and carrier apparatus shown mounted on a pickup truck and in a load carrying position.

Referring to the drawings and in particular to FIG. 1, shown therein and designated by a reference numeral 100 is a loader and carrier apparatus constructed in accordance with the present disclosure. The loader and carrier apparatus 100 includes a rack assembly 110 and a trailer assembly 150. The rack assembly 110 is adapted to be mounted on a vehicle 30, such as a conventional pickup truck 32 as seen in FIG. 1. Pickup truck 32 includes a towing ball 34, a tail gate 36, and a cargo bed 38.

FIG. 1 shows the trailer assembly 150 mounted on the rack assembly 110 which is mounted to the vehicle 30, as depicted by the pickup truck 32. The apparatus 100 in the embodiment in FIG. 1 is shown carrying a boat 40 with attached motor 50, though it will be appreciated that the apparatus 100 may be used to other types of recreational vehicles such as personal watercrafts, all terrain vehicles, snow mobiles, other small wheeled vehicles or the like.

FIG. 2 is a perspective view of the rack assembly 110 and a winch 134 connected thereto. The rack assembly 110 has a front end 112 and a rear end 116. In one embodiment, the rack assembly 110 has a rectangular portion constructed of multiple vertical and horizontal support members and configured to be positionable in the cargo bed 38 of the pickup truck 32 and an extension portion extendible over the roof of the vehicle 30. The rack assembly 110 is shown to have at least one horizontal front crossbar 114, and in a preferred embodiment has multiple horizontal front crossbars 114a, 114b, 114c and 114d. The horizontal front crossbars 114 are connected by angled rack support members 115a and 115b as well as vertical support members 117a, 117b, and 117c. In other embodiments, the horizontal front crossbars 114 may be connected in any like fashion suitable to support the rack assembly 110 and loaded trailer assembly 150.

In one preferred embodiment, the rear end 116 of the rack assembly 110 is provided with at least two horizontal crossbars—an upper rear crossbar 118 and a lower rear crossbar 120. The lower rear crossbar 120 may be provided with rollers 124a to rollingly support the trailer assembly 150 across the rack assembly 110. As best shown in FIG. 6, the rear lower crossbar 120 is preferably located above the cargo bed 38 of the pickup truck 32 but below the top of the cargo bed 38 walls when the rack assembly 110 is mounted to the pickup truck 32. The rear upper crossbar 118 is provided with a rear upper crossbar ring 126, the purpose of which is explained in the description of the operation to load the trailer assembly 150 onto the rack assembly 110. As will be discussed below, the upper and lower rear crossbars 118 and 120 are selectively detachable from the rack assembly 110.

Referring again to FIG. 2, the rack assembly 110 has a middle horizontal crossbar 122 positioned between the front end 112 and the rear end 116. The angled rack support members 115a and 115b extend from the front end 112 to the upper middle crossbar 122. The angled rack support members 115a and 115b provide structural support to the rack assembly 110 as well as providing support for the weight of the trailer assembly 150 and boat 40 when loaded. The middle crossbar 122 is provided with rollers 124b or some like means of rollingly supporting the trailer assembly 150 across the rack assembly 110.

The front end 112, rear end 116, and upper middle crossbar 122, are connected by upper horizontal bars 125a and 125b, as well as lower horizontal bars 127a and 127b. The upper horizontal bars 125a and 125b are connected to the lower horizontal bars 127a and 127b by the vertical rack support members 117a-117g. The height of the vertical rack support members 117 determines the height of the rack assembly 110 over the towing vehicle 30, allowing for additional cargo carrying capability.

In one embodiment, the rack assembly 110 also has at least one landing bracket 128 attached to the front end 112 which guides the trailer assembly 150 as it is lowered to the rack assembly 110. Further, at least one trailer stop 130 is attached to the front end 112 of the rack assembly 110 to halt forward movement of the trailer assembly 150 once it is lowered to the rack assembly 110. The rack assembly 110 is also provided with at least one latch 132a-132d to secure the trailer assembly 150 to the rack assembly 110 once mounted, as depicted in FIG. 1.

The winch assembly 134 includes a cable 136 or other suitable cable-like member. The winch 134 is shown to be connected to the front end 112 of the rack assembly 110, but it will be appreciated that the winch 134 may be located in a variety of locations so long as the cable 136 is able to extend over the middle horizontal crossbar 122 in a manner to be discussed below. The cable 136 is provided with a hook 138 to connect to the trailer assembly 150. The rack winch 134 may be any type of winch commonly known in the art such as a manual or motorized.

Referring now to FIG. 3, in one embodiment, the trailer assembly 150 includes a frame 151 and an axle assembly 170. The frame 151 is shown to include support members 152a and 152b and support cross bars 153a and 153b. In one embodiment, the trailer assembly 150 has an upwardly angled or slanted front end 154. Extending from the upwardly slanted front end 154 is a trailer coupler 156, which is well known in the art for connecting a trailer to a tow ball 34 on a towing vehicle 10. The trailer coupler 156 extends from the upwardly slanted front end 154 from a location a distance spaced from the lower end of the frame 151 such that the upwardly slanted front end 154 serves as a transition surface in a manner that will be more evident below. Also connected to the upwardly slanted front end 154 is boat stop 182 which assists in keeping boat 40 in place on the trailer assembly 150.

Figure 10:
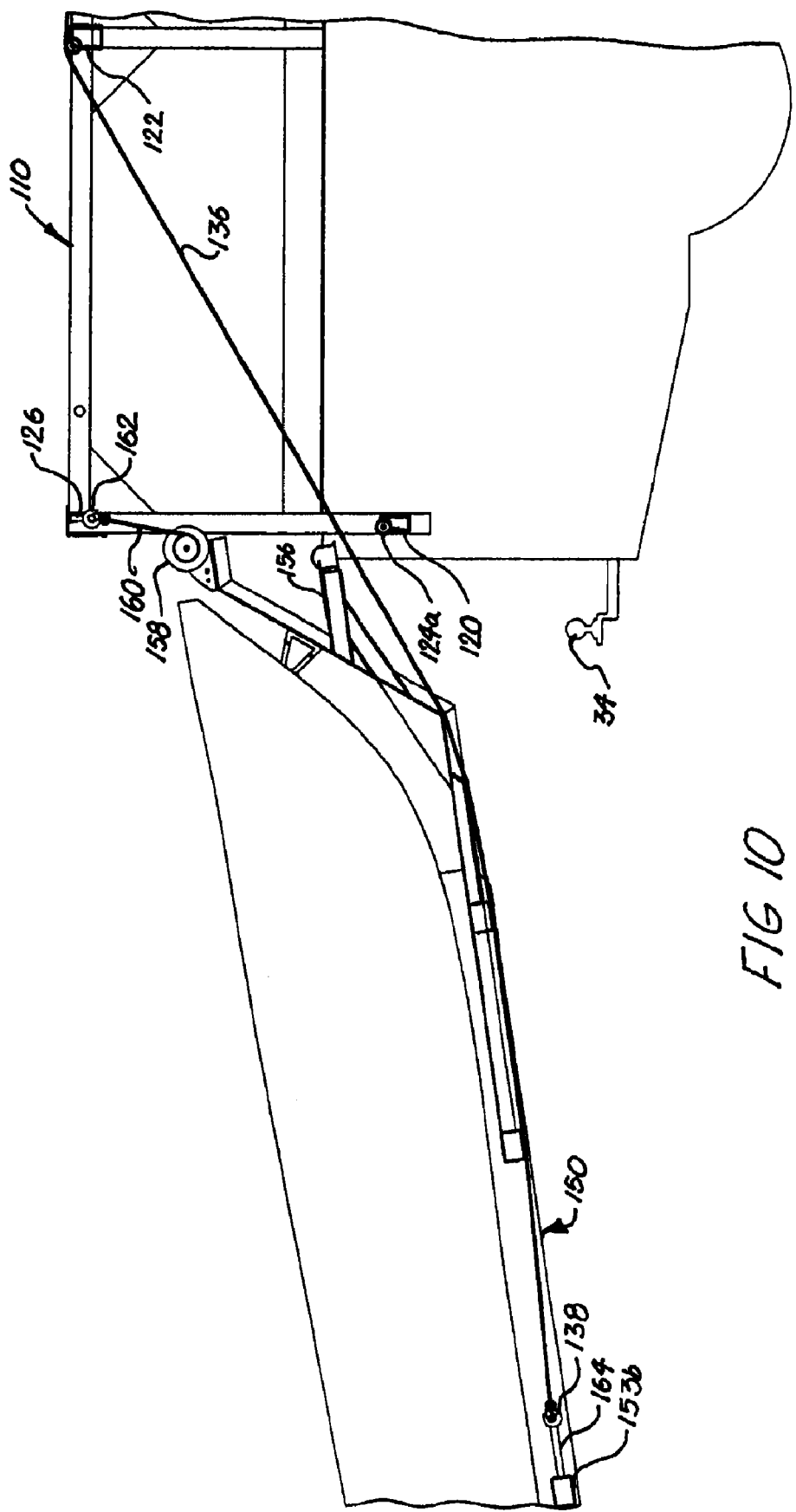
FIG. 10 is a cross-sectional view taken along line 10-10 of FIG. 7.

The trailer assembly 150 is also provided with a boat winch 158 connected to the top portion of the upwardly slanted front end 154. The boat winch 158 is provided with a boat winch cable 160, or like connecting means, which is further connected to a boat winch cable hook 162 (FIG. 10).

The trailer assembly 150 if further provided with a trailer support crossbar ring 164 mounted on a trailer support crossbar 153a or 153b. In other embodiments, the ring 164 may be mounted on the trailer support members 152a and 152b. The trailer support crossbar ring 164 is used to connect to the cable hook 138 of the winch 134, as explained below.

The axle assembly 170 has a horizontal axle 172 and wheels 174a and 174b. In one embodiment, the horizontal axle assembly 170 is located on the frame 151 at a sufficient distance from the back of the frame 151 and mounted boat 40 such that the fin on the boat motor 50 will clear the ground when the trailer assembly 150 and boat 40 are loaded onto the rack assembly 110.

Referring to FIG. 12, the trailer assembly 150 may further include a boat motor fin holder 180 to hold the boat motor 50 fin in place.

Operation

Figure 4:
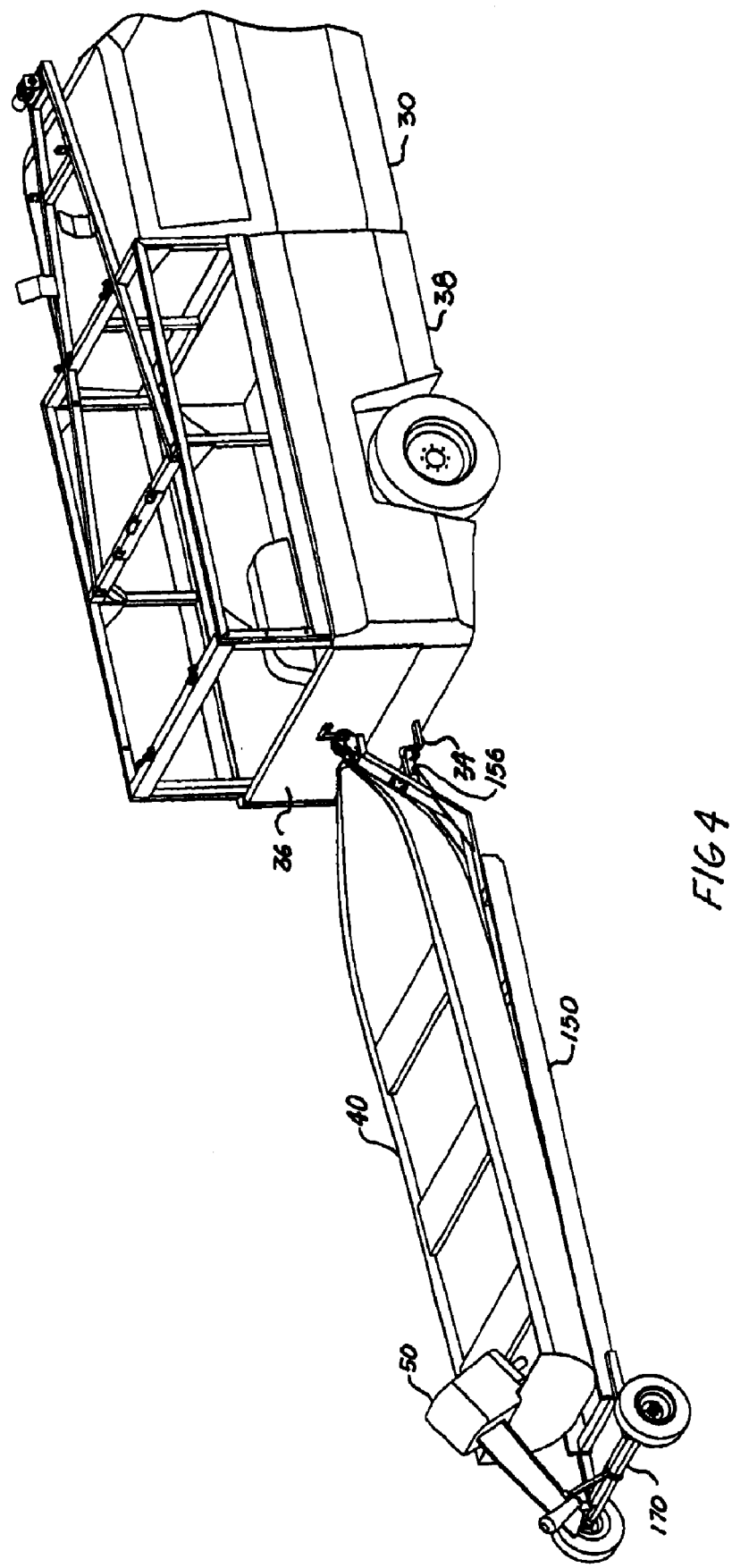
FIG. 4 is a perspective view of the apparatus shown in a towing position.

FIG. 4 depicts the trailer assembly 150 loaded with the boat 40 and connected to the vehicle 30 through the trailer coupler 156 on the towing ball 34. This is the position used to pull the trailer assembly 150 or back the trailer assembly 150 into the water for off-loading the boat 40. The operation for loading the trailer assembly 150 onto the rack assembly 110 begins with unlocking the trailer coupler 156 from the towing ball 34. If the vehicle 30 is a pickup truck 32, the tailgate 36 is also removed.

As depicted in FIG. 6, the lower rear crossbar 120 is attached to the rack assembly rear end 116 in a location that is above the pickup truck 32 cargo bed 38, but below the level of the cargo bed walls. When loading the trailer assembly 150 onto the rack assembly 110, the boat winch cable hook 162 is connected to the rear upper crossbar ring 126 attached to the rack assembly 110 rear upper crossbar 118. The boat winch 158 is then used to lift the trailer assembly 150 until the trailer coupler 156 is positioned above the rear lower crossbar 120, as best shown in FIG. 10. After the trailer assembly 150 is lifted, the cable hook 138 of the winch 134 is connected to the trailer support crossbar ring 164 having been extended over the middle horizontal crossbar 122 and the lower rear horizontal crossbar 120 (FIGS. 10 and 11).

Referring now to FIG. 11, the boat winch cable hook 162 is then unhooked from the rear upper crossbar ring 126 and attached to the boat 40 as a means for further securing the boat 40 to the trailer assembly 150. The rear upper crossbar 118 is then removed from the rack assembly 110. Next, the winch 134 is actuated to pull the trailer assembly 150 with boat 40 over the rear lower crossbar 120 and then the upper middle crossbar 122. It will be appreciated that the upwardly slanted front end 154 of the frame 151 functions to lift the trailer assembly 150 upwardly when the upwardly slanted front end 154 engages the rear lower crossbar 120. To the end, the angle of the upwardly slanted front end 154 may be varied. In the preferred embodiment, both the rear lower crossbar 120 and the upper middle crossbar 122 are provided with crossbar rollers 124a and 124b to assist in moving the trailer assembly 150 over the crossbars.

The winch 134 continues to pull the trailer assembly 150 forward until trailer assembly 150 is caused to rotate about the middle horizontal crossbar 122 to a substantially horizontal position on the rack assembly 110. The lowering of the front of the trailer assembly 150 is guided by landing brackets 128 which center the trailer assembly 150 on the rack assembly 110. The horizontal forward movement is stopped when the trailer assembly 150 contacts the trailer stop 130 located on the front end 112 of the rack assembly 110. Once the trailer assembly 150 is in place, the latches 132a-132d are used to secure the trailer assembly 150 to the rack assembly 110. Further straps may be used to secure the boat 40 and trailer assembly 150 to the rack assembly 110, as is commonly known in the art.

Referring now to FIGS. 1 and 12, the rear upper crossbar 118 is then reattached to the rack assembly 150 to provide further support for the trailer assembly 150. If desired, the rear lower crossbar 120 can be removed to provide more cargo space in the bed of the pickup 32 and the tail gate 36 can be reattached.

To remove the trailer assembly 150 from the rack assembly 110, the steps described above are carried out in reverse order.

Referring now to FIGS. 13 and 14, the loader and carrier apparatus 100 may be adapted to carry other recreational vehicles such as personal watercraft, all terrain vehicles, snow mobiles, small wheeled vehicles and the like. In an alternative embodiment of the loader and carrier apparatus to carry personal watercraft, as depicted in FIG. 13, a stop bracket 62 is mounted to the trailer assembly 150 to compensate for a shorter hull.

In another embodiment as depicted in FIG. 14, the trailer assembly 150 is provided with a track mounting adaptor 64 consisting of a track along the sides of the trailer assembly 150. The tracks enable the trailer assembly 150 to be used for wheeled vehicles, such as all terrain vehicles or snowmobiles. To this end, floor rings may be recessed into the trailer assembly 150.

It should be understood that the inventive concepts disclosed herein offer several advantages over previous designs. For example, it requires fewer parts due to the absence of ramps or complicated track systems, which reduces production cost by using fewer materials and increasing manufacturing speed. Fewer parts also can be translated as a lighter weight apparatus which allows truck to carry bigger loads, either a heavier boat, bigger camper or a heavier load on cargo bed. It only has two pieces the customer has to move; therefore the loading time is reduced greatly. Once boat has been loaded and removable parts are back in place the space between top of rack and cargo bed is clear for any additional load, not limiting the functionality of the truck. The manner in which the bottom of the rack is configured enables users to install a tool box in cargo bed.

From the above description, it is clear that the inventive concepts disclosed and claimed herein are well adapted to carry out the objects and to attain the advantages mentioned herein, as well as those inherent in the invention. While presently preferred embodiments of the inventive concepts have been described for purposes of this disclosure, it will be understood that numerous changes may be made which will readily suggest themselves to those skilled in the art and which are accomplished within the spirit of the inventive concepts disclosed and/or as defined in the appended claims.

What is claimed is:

1. An apparatus for loading and carrying a recreational vehicle on a second vehicle, the apparatus comprising:
   a trailer assembly on which the recreational vehicle is positionable, the trailer assembly including a frame with an upwardly slanted front end, a coupler for connecting to the second vehicle, means for rollingly supporting the frame, and a boat winch connected to a front end of the frame of the trailer assembly;
   a rack assembly mountable on top of the vehicle, the rack assembly having a front end and a rear end, the rack assembly further having a middle horizontal crossbar positioned between the front end and the rear end, a lower rear horizontal crossbar positioned at the rear end and at a level lower than the middle horizontal crossbar, and an upper rear horizontal crossbar positioned at the rear end of the rack assembly in horizontal alignment with the middle horizontal crossbar and in spaced apart, vertical alignment with the lower rear horizontal crossbar such that the boat winch is operably connectable to the upper rear horizontal crossbar so that operation of the boat winch causes the coupler of the trailer assembly to be positioned above the lower rear horizontal crossbar and below the upper rear horizontal crossbar, the upper rear horizontal crossbar being releasably attached to the rack assembly so that the upper rear horizontal crossbar is selectively detachable from the rack assembly; and
   a winch having a cable, the winch connected to the rack assembly such that the cable is extendible over the middle horizontal cross bar and connectable to the frame of the trailer assembly such that when the upper rear horizontal crossbar is detached from the rack assembly, actuation of the winch pulls the upwardly slanted front end of the trailer assembly into contact with the lower horizontal crossbar so as to guide the frame in an upward direction and thereafter pulls the frame of the trailer assembly along the lower rear horizontal crossbar and the middle horizontal crossbar until the trailer assembly is caused to move through space vacated by the upper rear horizontal crossbar to a substantially horizontal position on the rack assembly.

2. The apparatus of claim 1 wherein the lower rear horizontal crossbar and the middle horizontal crossbar each includes means for rollingly supporting the trailer assembly.

3. The apparatus of claim 1 wherein the lower rear horizontal crossbar is selectively detachable from the rack assembly.

4. The apparatus of claim 1 wherein the rack assembly further comprises a pair of landing brackets positioned on a top of the rack assembly so as to control the horizontal position of the trailer assembly on the rack assembly.

5. The apparatus of claim 4 wherein the rack assembly further comprises at least one trailer stop positioned on the top of the rack assembly so as to control a forward position of the trailer assembly on the rack assembly.

6. The apparatus of claims 5 wherein the rack assembly further comprises at least one latch positioned on top of the rack assembly and engageable with the trailer assembly so as to secure the trailer assembly on the rack assembly.

7. The apparatus of claim 1 wherein the cable of the winch is connectable to a medial location of the frame of the trailer assembly.

8. The apparatus of claim 1 wherein the means for rollingly supporting the frame of the trailer assembly includes a horizontal axle assembly located at a rear end of the frame of the trailer such that a motor fin of a boat positioned on the frame clears the ground when the trailer assembly is pulled onto the rack assembly.

\* \* \* \* \*